US006168234B1

(12) United States Patent
Haynes et al.

(10) Patent No.: US 6,168,234 B1
(45) Date of Patent: Jan. 2, 2001

(54) SEAT ASSEMBLY INCLUDING A VEHICLE SEAT AND SYSTEM FOR ROTATING SAME

(75) Inventors: Ian D. Haynes, Windsor (CA); John A. Quoziente, Allen Park, MI (US); Michelle A. Girolamo, Livonia, MI (US); Gregg A. Gibbons, Rochester Hills, MI (US); Richard D. Sanders, Clarkston, MI (US)

(73) Assignee: Lear Corporation, Southfield, MI (US)

( * ) Notice: Under 35 U.S.C. 154(b), the term of this patent shall be extended for 0 days.

(21) Appl. No.: 09/259,823

(22) Filed: Mar. 1, 1999

(51) Int. Cl.⁷ ..................................................... A47C 1/02
(52) U.S. Cl. .................................. 297/344.23; 297/344.21
(58) Field of Search ........................ 297/344.21, 344.23, 297/344.26; 248/415, 425, 349.1

(56) References Cited

U.S. PATENT DOCUMENTS

| | | |
|---|---|---|
| 2,587,679 | 3/1952 | Atkinson . |
| 2,992,852 | 7/1961 | Loofbourrow et al. . |
| 3,051,522 | 8/1962 | Meyers . |
| 3,104,911 | 9/1963 | Jomes et al. . |
| 4,436,270 | 3/1984 | Muraishi . |
| 4,792,188 | 12/1988 | Kawashima . |
| 4,802,706 | 2/1989 | Onimaru et al. . |
| 4,969,685 * | 11/1990 | Chihaya et al. ................. 297/344.23 |
| 5,000,505 | 3/1991 | Kawashita et al. . |
| 5,474,353 | 12/1995 | Koester et al. . |
| 5,524,952 | 6/1996 | Czech et al. . |
| 5,540,482 | 7/1996 | Baret et al. . |
| 5,634,537 | 6/1997 | Thorn . |
| 5,651,576 | 7/1997 | Wallace . |
| 5,720,462 | 2/1998 | Brodersen . |

FOREIGN PATENT DOCUMENTS

| | | |
|---|---|---|
| 0 830 971 A2 | 3/1998 | (EP) . |
| 0 850 834 A1 | 7/1998 | (EP) . |

* cited by examiner

*Primary Examiner*—Milton Nelson, Jr.
(74) *Attorney, Agent, or Firm*—Brooks & Kushman P.C.

(57) ABSTRACT

A seat assembly including a vehicle seat and a system for rotating a vehicle seat are provided wherein the system is designed to carry integrated seat restraint loads. The seat includes a base having a lower base section and an upper base section which supports the vehicle seat on an upper surface thereof. A reversible DC motor and a transmission including a drive screw are supported on the lower base section. A flexible cable couples an output shaft of the DC motor to the drive screw which rotates about a horizontal axis upon actuation of the DC motor. The transmission also includes a drive nut threadedly mounted on the drive screw to move along the substantially horizontal axis upon actuation of the motor. The transmission further includes a link coupled to the upper base section and the drive nut to transmit linear motion of the drive nut to rotary motion of the upper base section. The system also includes a bearing assembly having a plurality of thrust bearings which rotatably supports the upper base section on the lower base section. The lower base section includes a tongue portion clamped between the thrust bearings. The system provides a compact structure which fits completely under the vehicle seat and is capable of carrying the integrated seat restraint loads including shoulder belt load and lap belt load.

6 Claims, 3 Drawing Sheets

SEAT ASSEMBLY INCLUDING A VEHICLE SEAT AND SYSTEM FOR ROTATING SAME

TECHNICAL FIELD

This invention relates to seat assemblies including vehicle seats and systems for rotating same.

BACKGROUND ART

It is often desirable to have a vehicle seat which, during vehicle movement, is positioned in a forwardly-directed, home position within the vehicle and, during occupant ingress or egress, is positioned in a side position rotated approximately 45°–90° from the home position so that the occupant can easily enter or exit the vehicle.

A swivel mechanism or system for such a vehicle seat, however, must be capable of handling the various reactions and stresses which such a swivel mechanism will encounter when the seat includes integrated passenger restraints which are oftentimes provided with current vehicle seats. Such restraints typically include shoulder and lap belts.

The following U.S. patents are related to such swivel mechanisms for vehicle seats: U.S. Pat. Nos. 2,587,679; 2,992,852; 3,051,522; 3,104,911; 4,436,270; 4,792,188; 4,802,706; 5,000,505; 5,474,353; 5,524,952; 5,540,482; 5,634,537; 5,651,576; and 5,720,462.

DISCLOSURE OF INVENTION

An object of the present invention is to provide a seat assembly including a vehicle seat and system for rotating same wherein the system for rotating the vehicle seat is relatively compact yet strong enough to carry integrated seat restraint loads.

In carrying out the above object and other objects of the present invention, a seat assembly including a vehicle seat is provided. The assembly also includes a base having a lower base section and an upper base section which supports the vehicle seat. The assembly further includes an actuator having an output shaft mounted on the lower base section and a bearing assembly for rotatably supporting the upper base section on the lower base section. The assembly also includes a transmission for mechanically coupling the output shaft of the actuator to the upper base section. The upper base section rotates about a substantially vertical axis relative to the lower base section between a forwardly-directed home position and a side position of the vehicle seat upon actuation of the actuator.

Preferably, the transmission includes a drive screw rotatably supported on the lower base section in driving engagement with the output shaft of the actuator to rotate about a substantially horizontal axis upon actuation of the actuator.

Also, preferably, the transmission includes a drive nut threadedly mounted on the drive screw to move along the substantially horizontal axis upon actuation of the actuator.

The transmission further includes a flexible cable for coupling the output shaft of the actuator to the drive screw.

Preferably, the transmission includes a link coupled to the upper base section and the drive nut to transmit linear motion of the drive nut to rotary motion of the upper base section.

Preferably, the actuator is an electromagnetic actuator such as a reversible DC motor.

Also, preferably, the bearing assembly includes a plurality of thrust bearings and the lower base section includes a tongue portion clamped between the thrust bearings.

Preferably, the tongue portion is integrally formed with the lower base section.

Also, preferably, the lower base section is a metal plate wherein the tongue portion is an annular tongue portion integrally formed with the metal plate.

Still, preferably, the upper base section is a metal plate having an upper surface and wherein the vehicle seat is supported on the upper surface thereof.

Still further in carrying out the above object and other objects of the present invention, a system for rotating a vehicle seat is provided as described above.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
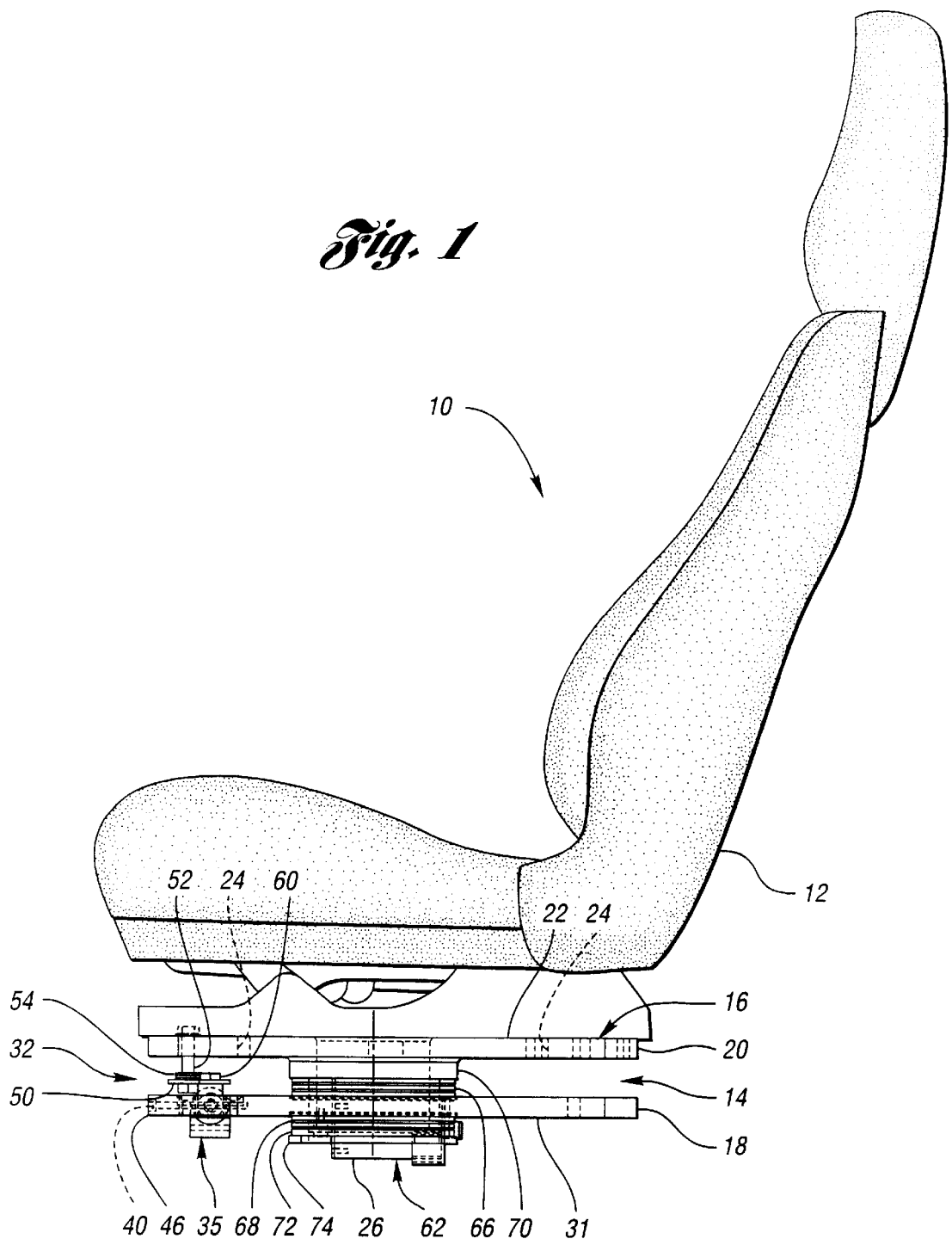
FIG. 1 is a side elevational view of a seat assembly including a vehicle seat constructed in accordance with the present invention.

Referring now to the drawing Figures, there is illustrated in FIG. 1 a seat assembly such as an automotive vehicle seat assembly, generally indicated at 10, constructed in accordance with the present invention. The seat assembly 10 includes a vehicle seat 12 fixedly secured to a system, generally indicated at 14, for rotating the vehicle seat 12 between a forwardly-directed home position, as indicated in FIG. 1, and a side position in which the vehicle seat 12 is rotated approximately 90° from its forwardly-directed home position. As illustrated in FIG. 1, the system 14 is compact and fits completely beneath the vehicle seat 12. Furthermore, the system 14 is designed to carry integrated seat restraint loads such as shoulder and lap belt loads.

Referring now to FIGS. 1–4, the system 14 includes a base, generally indicated at 16, including a lower base section or metal plate 18 and an upper base section or metal plate 20. The upper base section 20 has an upper surface 22 on which the vehicle seat 12 is supported and fixedly secured such as by bolts (not shown) which extend through bolt holes 24.

The system 14 further includes an actuator in the form of an electromagnetic actuator such as a reversible DC motor 26 having an output shaft 28. The motor 26 receives control signals from a drive circuit (not shown) to rotate the output shaft 28. The motor 26 is mounted by means of a mounting bracket 30 to a lower surface 31 of the lower base section 18.

Figure 2:
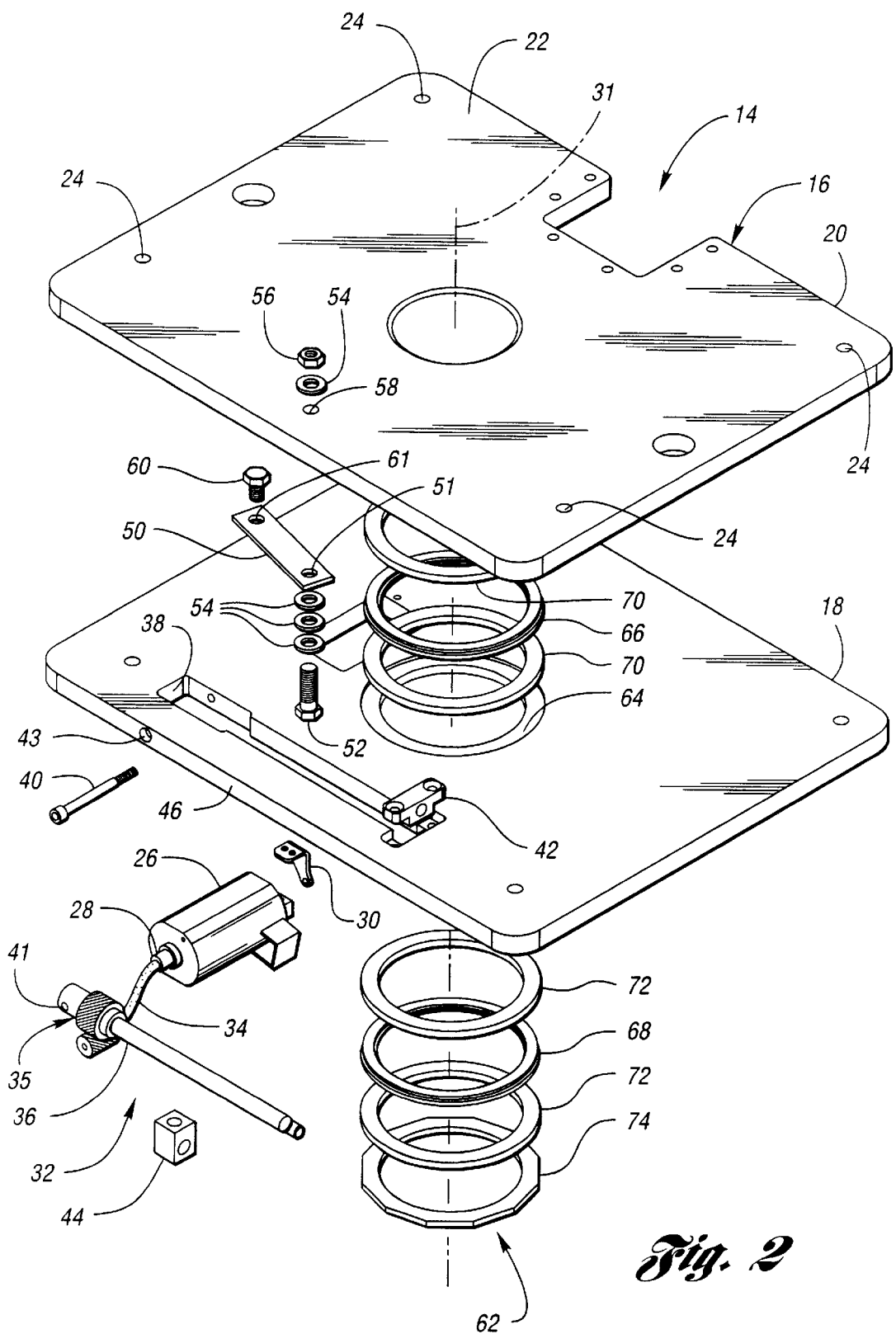
FIG. 2 is an exploded view of a system for rotating the vehicle seat constructed in accordance with the present invention.
Figure 3:
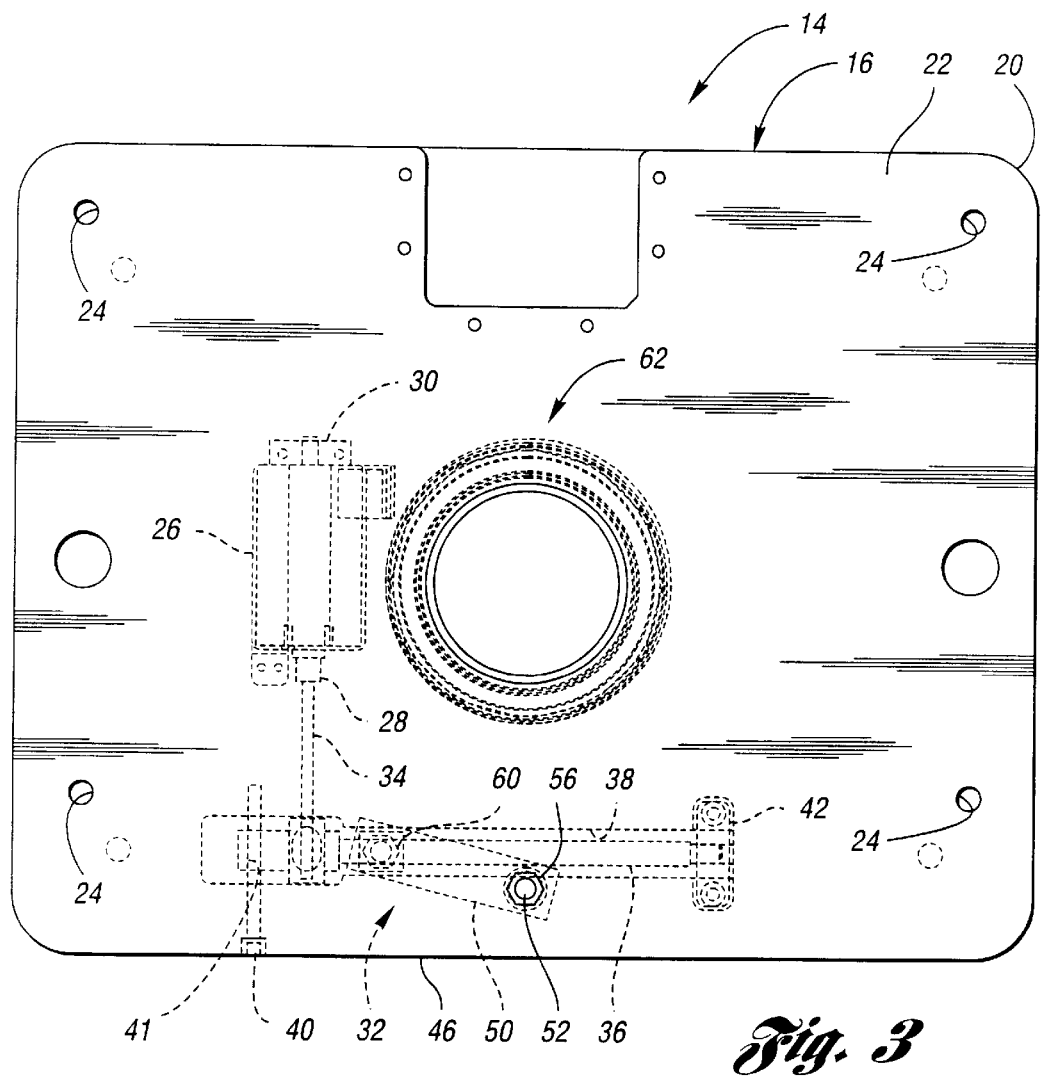
FIG. 3 is a top plan view of the system of FIG. 2 with the actuator, bearing assembly, and transmission of the system indicated by phantom lines.
Figure 4:
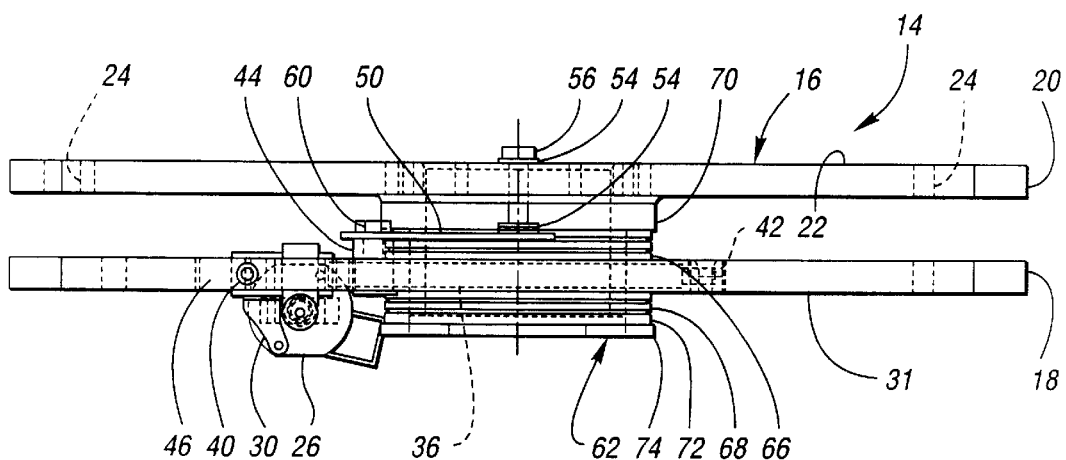
FIG. 4 is a front elevational view of the system of FIG. 3.

The system 14 further includes a transmission, generally indicated at 32, for mechanically coupling the output shaft 28 of the actuator 26 to the upper base section 20. In this way, the upper base section 16 rotates about a substantially vertical axis 31 of rotation, as best shown in FIG. 2, relative to the lower base section 18 between the home position of the vehicle seat 12 shown in FIG. 1 and a side position approximately 45° out of the home position upon actuation of the motor 26. Obviously, a larger or slightly smaller angle could also be specified. The time of movement between the two positions is preferably about 3-6 seconds.

The transmission 32 includes a flexible cable 34 which couples the output shaft 28 of the motor 26 to a screw drive, generally indicated at 35. The screw drive 35 includes a drive screw 36 which is rotatably supported on the lower base 18 by a pillow block 42 to rotate about a substantially horizontal axis upon actuation of the motor 26. The pillow block 42 is mounted within the channel 38 by bolts (not shown). The screw drive 35 is supported on the lower base section 18 within a channel 38 formed therein by a mounting bolt 40 which extends through a hole 41 formed in the screw drive 35 and a hole 43 formed in a side surface 46 of the lower base section 18 when the holes 41 and 43 are aligned.

The transmission 32 further includes an internally threaded drive nut 44 threadedly mounted on the drive screw 36 to linearly move along the substantially horizontal axis upon actuation of the motor 26.

The transmission 32 further includes swivel linkage in the form of a link 50 coupled to the upper base section 20 by means of a bolt 52, washers 54 and a nut 56. The bolt 52 extends through a hole 51 formed at one end of the link 50 and a hole 58 formed through the top plate 20. The link 50 is also threadedly connected to the drive nut 44 by a bolt 60 which extends through a hole 61 formed in the opposite end of the link 50. The link 50 transmits and transforms motion and power of the drive nut 44 to rotary motion and power of the upper base section 20 upon actuation of the motor 26.

The system 14 further includes a bearing assembly, generally indicated at 62, for rotatably supporting the upper base section 20 on the lower base section 18. The lower base section 18 includes an annular tongue 64 integrally formed with the lower base section 18.

The bearing assembly 62 includes a pair of upper thrust bearings 66 and a pair of lower thrust bearings 68 between which the tongue portion 64 is clamped. The bearing assembly 62 further includes a pair of upper thrust washers 70 and a pair of lower thrust washers 72. The upper pair of thrust bearings 66 are clamped between the upper pair of thrust washers 70 and the pair of lower thrust bearings 68 are clamped between the pair of lower thrust washers 72 by a jam nut 74 which is threadedly mounted on a central mounting bolt (not shown) which extends from a lower surface of the vehicle seat 12 along the axis 34.

Optionally, a feedback sensor in the form of a position or proximity sensor may be located at, on or adjacent the output shaft 28 of the motor 26 to provide a feedback control signal to a controller (not shown) for the motor 26 to ensure that the vehicle seat 12 is precisely swivelled between the forwardly-directed home position illustrated in FIG. 1 and its side position, approximately 45° from the forwardly-directed position of FIG. 1.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A seat assembly comprising:

a vehicle seat;

a base including a lower base section and an upper base section, the upper base section supporting the vehicle seat;

an actuator including an output shaft mounted on the lower base section;

a bearing assembly including a plurality of thrust bearings for rotatably supporting the upper base section on the lower base section; and a transmission for mechanically coupling the output shaft of the actuator to the upper base section, wherein the upper base section rotates about a substantially vertical axis relative to the lower base section between a forwardly-directed home position and a side position of the vehicle seat upon actuation of the actuator.

2. The assembly as claimed in claim 1 wherein the transmission includes a drive screw rotatably supported on the lower base section and in driving engagement with the output shaft of the actuator to rotate about a substantially horizontal axis upon actuation of the actuator.

3. The assembly as claimed in claim 1 wherein the actuator is an electromagnetic actuator.

4. The assembly as claimed in claim 1 wherein the lower base section includes a tongue portion clamped between the thrust bearings.

5. The assembly as claimed in claim 1 wherein a portion of the lower base section is clamped between the thrust bearings.

6. The assembly as claimed in claim 1 wherein the vehicle seat is an automotive seat.

\* \* \* \* \*